April 18, 1944.　　　　　L. EISELE　　　　　2,346,832
BOTTLE WITH TEMPERATURE INDICATING MEANS
Filed Oct. 8, 1943

LOGAN EISELE
INVENTOR.
BY Robert J. Killman
ATTORNEY.

Patented Apr. 18, 1944

2,346,832

UNITED STATES PATENT OFFICE 2,346,832

BOTTLE WITH TEMPERATURE INDICATING MEANS

Logan Eisele, Nashville, Tenn.

Application October 8, 1943, Serial No. 505,441

3 Claims. (Cl. 73—343)

My invention relates to bottles and other containers having temperature indicating means incorporated therein. It particularly relates to infant nursing bottles having a liquid bulb thermometer positioned in one wall thereof and is especially directed to means for positively securing the thermometer in said wall.

I am aware that in the past such bottles have been made and that thermometers have been secured in a depression in the wall thereof by elastic bands, cement, and the like. Such retaining means have generally proved unsatisfactory and have allowed the thermometer to become unfastened after a few sterilizations of the bottle in boiling water.

It is an object of my invention to provide means for positively and securely retaining the thermometer in place in proper position relative to its scale, which may be engraved on the bottle wall, without the use of cementitious material upon the thermometer tube which often causes a dirty appearance of the thermometer tube and bulb.

Figure 1:
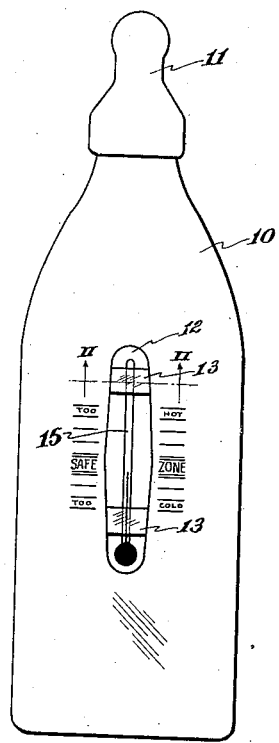
Figure 2:
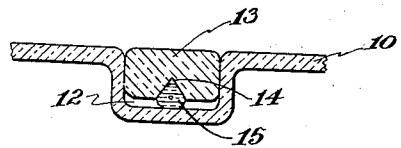

The means by which I accomplish this and other objects will be more readily understood by referring to the accompanying drawing in which Figure 1 is a front elevation of a bottle of my invention, and Figure 2 is a fragmentary sectional view taken along the line II—II of Figure 1.

Referring now to the drawing in more detail the numeral 10 denotes a nursing bottle of glass or other suitable material carrying at its upper end a rubber nipple 11. Formed in one wall of bottle 10 is the depression 12 of the shape shown having a flat bottom, side walls substantially perpendicular to the bottom surface and tapering toward one another from the center portion to each end.

The retaining members 13, having a notch 14 in their underfaces to receive the thermometer 15 and ends tapered to fit the side walls of depression 12, serve to retain the thermometer 15 in place, by reason of their being wedged into the tapering ends of depression 12.

It is within the scope of my invention for the side walls of depression 12 to be tapered in any one of several ways i. e. the walls may taper toward each other from the center to each end, as shown, from one end to the other, from each end to the center, from one end to the center and from the center to the other end, and either wall may be parallel to the central axis of the depression 12 while all of the taper may be in the other wall.

Suitable scales or other indicia may be placed on the surface of the bottle or upon the thermometer. The retaining members 13 may be made of any suitable material but preferably are made of some transparent substance such as glass or plastic.

Having thus described my invention, what I claim as new and desire to secure by Letters Patent is:

1. A bottle having a depression formed in the wall thereof, at least a portion of one of the side walls defining said depression being non-parallel to the opposing side wall, a thermometer received in said depression and a retaining member wedged between the two non-parallel side walls and retaining the thermometer rigidly in position.

2. A bottle having a depression formed in the wall thereof, said depression being defined by side walls, at least a portion of which taper toward each other, a thermometer retaining member wedged between said tapering walls and a thermometer positioned in said depression and retained by said retaining member.

3. A bottle having a depression formed in the wall thereof, said depression being defined by a flat bottom and side walls substantially perpendicular to said bottom and tapering toward each other from the middle toward each end, retaining members wedged between said tapering walls and a thermometer retained in the depression by the retaining members.

LOGAN EISELE.